United States Patent Office 2,835,919
Patented May 27, 1958

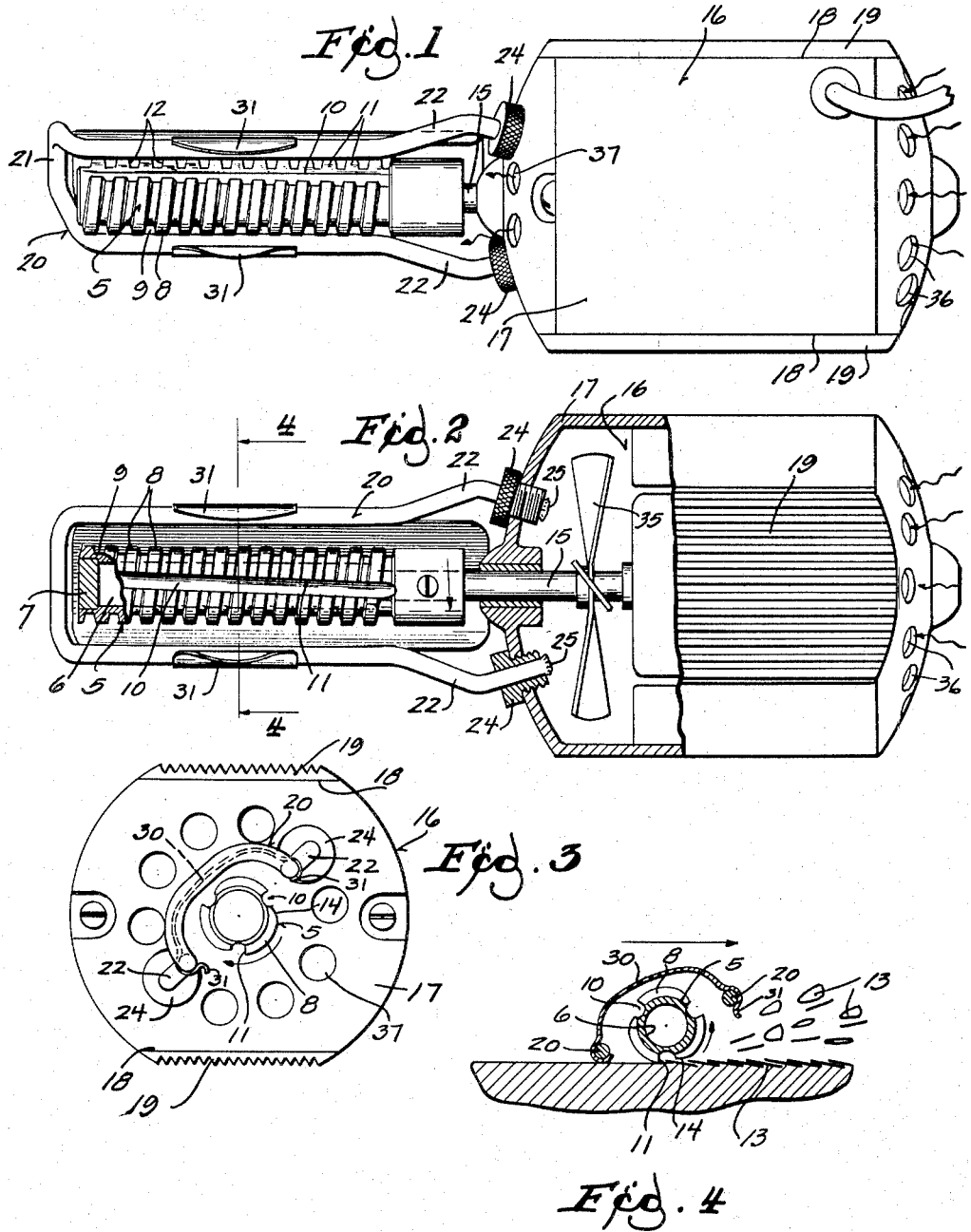

2,835,919
POWER OPERATED FISH SCALER

Bearl E. Colburn and Lee Colburn, Green Bay, Wis., assignors, by mesne assignments, to Homeward Products, Inc., a corporation of Wisconsin Application April 16, 1956, Serial No. 578,329

9 Claims. (Cl. 17—5)

This invention relates to a power operated fish scaler.

The casing of a small high speed motor may serve as a handle by means of which the scaler is manipulated over the scales to be removed. The scaling rotor per se is attached to the armature shaft of the motor and is wholly carried thereby. It is peripherally cut to provide alternating channels and lands intersected by generally axially extending channels which desirably have a very slight pitch. The peripheral channels are desirably also pitched, the arrangement being such as to tend to throw the scales away from the operator.

The scaling is done by the square cut or angularly disposed cutting edges of the lands, particularly at their ends, the side edges being incidentally effective by reason of the pitch. These square cut surfaces, moving at high speed with the armature shaft of the motor, engage the scales with impact sufficient to dislodge them instantly.

The scaling tool, as above described, is relatively safe from the standpoint of the operator. It may be rotated in direct contact with a person's skin without injury to the skin, since it depends for its action upon the ability to impact sharply the projecting edge of a scale. Nevertheless, a guard partially encircles the tool. The guard comprises a plate detachably carried on a relatively heavy bar mounted in the motor casing to extend lengthwise of the tool at opposite sides thereof.

In use the guard bar is employed to bear against the surface of the fish immediately behind the area in which the tool is operating, thereby anchoring the fish's body securely without requiring any extraneous clamps or other mechanical devices for this purpose. The operator simply holds the tool either in his right hand or left hand as may be convenient for him, tilting the tool so that the guard engages the fish. The tool is then moved progressively in a direction toward the head of the fish, completely dislodging all scales and/or fins which the rotating cutter engages. The guard plate prevents any of the scales or slime from being thrown toward the operator. The fish is left completely clean and slime-free.

In the drawing:

Fig. 1 is a view in side elevation, showing a complete device embodying the invention.

Fig. 2 is a view of the device from a viewpoint at right angles to the guard, portions of the scaling tool and portions of the rotor and the motor casing being broken away.

Fig. 3 is a view of the device in end elevation.

Fig. 4 is a view in transverse section through the scaling tool and guard on the line 4—4 of Fig. 2 and fragmentarily illustrating in section a fish upon which the scaling tool is operating.

The scaling tool comprises a rotor 5 that is generally cylindrically tubular, its hollow interior bore 6 being formed solely for the purpose of lightening the tool and being closed at the end by a plug 7.

Externally, the rotor is provided with a number of axially spaced lands 8 which are desirably cylindrically surfaced and formed by one or more channels 9 which may be helical to give the lands a slight pitch, desirable but not essential to the invention. The lands are interrupted at intervals by milled channels, grooves, cut-out portions or the like 10 which extend generally axially of the tool but may be inclined slightly as best shown in Fig. 2. In practice, three such channels or grooves are provided. The circumferential channels 9 and the longitudinally disposed channels or grooves 10 may be of uniform depth, although this is also immaterial. A depth of about one-fourth inch has been found satisfactory.

Wherever the lands are interrupted by a longitudinal channel such as that shown at 10, square cut scale dislodging edges are provided at 11. The lands also have square cut edges 12 formed by channels 9. Thus, the circumferentially disposed lands 8 and channels 9 may be interrupted by at least one longitudinally extending channel, groove, or cut-out portion 10 which forms the lands with longitudinally disposed cutting surfaces. The slots 9 are circumferentially spaced so that the flat top curved surfaces of the lands 8 provide means engageable with the body of the fish to limit the depth of cut of the teeth and thus insure the teeth removing only the scales or fins during the scaling operation. In other words, the teeth are so constructed and arranged so that they will not penetrate into the body of the fish or mutilate the same which not infrequently happens when no means are provided for limiting the depth of cut of the scaling teeth. These square cut edges, particularly those shown at 11, do the actual work of scale removal. When the rotor is rotated at high speed, the edges 11 and 12 engage the scales 13 to dislodge and project these as shown in Fig. 4. In order to facilitate sharp impact of the dislodging edges 11 against the scales, the surfaces of the lands are slightly relieved at 14 as best shown in Fig. 4. The scales are thrown from beneath the guard 20 in a direction away from the operator as clearly appears in that view.

In the preferred embodiment of the invention shown in Figs. 1, 2 and 3 the cutting rotor 5 is mounted on an armature shaft 15 of a high speed electric motor 16 from which the armature shaft 15 projects. The preferred motor casing 17 is generally cylindrical but has flattened areas at 18 to which are desirably applied grooved pads 19 of rubber or the like which provide a stable surface on which the motor will rest and also afford a more secure hand grip than would otherwise be available. It will be understood that the motor shell or casing serves as a handle by means of which the scaling rotor 5 is manipulated while mounted on the armature shaft.

The guard bar 20 is generally U-shaped in plan but has its bight 21 turned upwardly away from the rotor 5 as best shown in Fig. 1. The ends of the bar are slightly divergent at 22 and pass through threaded plugs 24 screwed into the motor shell or casing 17. The ends of the bar are headed or upset at 25 so that the ends of the bar cannot escape from the plugs 24 whereby they are anchored. An arcuately formed guard plate 30 generally encircles one side of the rotor between the two arms of the bar 20 and is provided with laterally projecting integral clip portions 31 which are hooked about the sides of the bar 20 as clearly shown in Fig. 4. This plate is readily removable for washing and is intended more for the interception of flying scales and the like than for the protection of the operator, since the scaling rotor is such that it can be operated in direct contact with a person's hand without injury. Yet the rotor will remove not only scales but fins as well, if desired.

It will be observed that the ends of the guard bar 20 enter the motor casing at points on or near a diameter through the armature shaft which is oblique respecting the planes of the flattened areas 18 of the motor shell. This assists in manipulating the tool in the desired position of operation shown in Fig. 4. With the fish suitably supported, the rotor is moved along the fish's body 14 in a direction toward the fish's head so that the free ends of the scales are engaged by the dislodging teeth 11 of the tool 5. The guard bar 20 (or the clip portion 31 of plate 30) is allowed to rest on the cleaned surface of the body behind the area in which the rotor is acting. This holds the body down to the supporting surface and makes is unnecessary to use any mechanical clamps or other devices. The smooth metal surfaces slide freely along the scaled body of the fish behind the scaling rotor and serve as a steady rest so that the rotor may be held at the level of the scales to operate readily thereon.

Since the motor casing is used as a handle for the manipulation of the scaling rotor, it is desirable that the motor casing be kept from becoming overheated. Accordingly an oversized fan 35 is desirably mounted on the armature shaft 15 and pitched to draw air through the inlet ports 36 and to expel it through the discharge ports 37. Due to the movement of the air toward the rotor, there is no tendency to draw into the motor casing foreign matter dislodged by the rotor.

We claim:

1. A fish scaler including a cylindrical rotor provided peripherally with alternating channels and lands extending circumferentially and lengthwise thereof, said lands being interrupted by a longitudinal groove extending lengthwise of the rotor and forming scaling teeth having cutting edges.

2. A fish scaler including a cylindrical rotor provided peripherally with alternating channels and lands extending circumferentially and lengthwise thereof, said lands being interrupted by at least one longitudinally extending groove, said groove forming the lands with longitudinally disposed cutting surfaces and the channels between the lands forming the confronting sides of the lands with circumferentially disposed cutting surfaces, said cutting surfaces coacting to provide scaling teeth having cutting edges.

3. A fish scaler including a cylindrical rotor having alternating channels and lands extending circumferentially and lengthwise thereof, and said lands being interrupted by circumferentially spaced, longitudinally extending grooves forming the lands with longitudinally spaced scaling teeth having cutting edges.

4. A fish scaler, as called for in claim 3, in which the channels are helically disposed so as to give a slight pitch to the lands.

5. A fish scaler, as called for in claim 3, in which the channels and grooves are of substantially the same depth.

6. A fish scaler, as called for in claim 3, in which a motor is operatively connected to said rotor, a casing for said motor, and a substantially U-shaped guard member having spaced longitudinally extending arms disposed on opposite sides of the rotor and connected at one end to said casing, a curved guard plate, and means for releasably connecting said plate to said arms.

7. A fish scaler, as called for in claim 3, in which a motor is operatively connected to said rotor, a casing for said motor, said rotor extending outwardly from one side of said casing, and a substantially U-shaped guard member having spaced longitudinally extending arms disposed on opposite sides of the rotor and connected at one end to said casing, said guard member having a transversely disposed bight portion at its opposite end and extending upwardly and adjacent the outer end of the rotor, a curved guard plate, and means for releasably connecting said plate to said arms.

8. A fish scaler, as called for in claim 6, in which the means for connecting the plate to the arms includes yieldable clip portions on opposite sides of the plate arranged releasably to engage said arms so as to prevent the scales from being thrown towards the operator.

9. A fish scaler, as called for in claim 6, in which said casing has a top flat portion and a bottom flat portion for facilitating the handling of the motor.

References Cited in the file of this patent

UNITED STATES PATENTS

| | | |
|---|---|---|
| D. 143,167 | Rieske | Dec. 11, 1945 |
| 1,235,085 | Weinberg | July 31, 1917 |
| 1,758,675 | Reilly | May 13, 1930 |
| 1,982,084 | Strand | Nov. 27, 1934 |
| 2,557,272 | Gabriel | June 19, 1951 |
| 2,630,599 | Grant et al. | Mar. 10, 1953 |

FOREIGN PATENTS

| | | |
|---|---|---|
| 131,961 | Australia | Mar. 29, 1949 |